(12) United States Patent
Reisch et al.

(10) Patent No.: US 7,703,348 B2
(45) Date of Patent: Apr. 27, 2010

(54) DEVICE FOR CONTROLLING AND/OR REGULATING A HYDRAULICALLY ACTIVATABLE SHIFTING ELEMENT OF A GEARING MECHANISM AND A GEARING MECHANISM

(75) Inventors: Matthias Reisch, Ravensburg (DE); Martin Grumbach, Heimenkrich (DE); Hans-Jörg Domian, Immenstaad (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 365 days.

(21) Appl. No.: 11/636,100

(22) Filed: Dec. 8, 2006

(65) Prior Publication Data

US 2007/0135258 A1    Jun. 14, 2007

(30) Foreign Application Priority Data

Dec. 9, 2005    (DE) .................. 10 2005 058776

(51) Int. Cl.
*B60K 3/00* (2006.01)

(52) U.S. Cl. .................. 74/473.11; 74/89.23

(58) Field of Classification Search ........... 74/89.23, 74/424.7, 335, 473.11, 473.12; 60/584, 545, 60/565, 534, 449, 452, 592, 455; 91/1, 5; 192/30 W See application file for complete search history.

(56) References Cited

U.S. PATENT DOCUMENTS

| | | | | |
|---|---|---|---|---|
| 3,236,049 A | * | 2/1966 | Reinke | 60/444 |
| 4,121,504 A | * | 10/1978 | Nowak | 92/137 |
| 4,425,758 A | * | 1/1984 | Schexnayder et al. | 60/403 |
| 4,941,372 A | * | 7/1990 | Aoki et al. | 477/129 |
| 5,788,341 A | * | 8/1998 | Penrod et al. | 303/115.2 |
| 6,234,061 B1 | * | 5/2001 | Glasson | 92/5 R |
| 6,467,266 B1 | * | 10/2002 | Kanazawa et al. | 60/552 |
| 6,705,175 B1 | * | 3/2004 | Klatt | 74/335 |
| 7,097,019 B2 | * | 8/2006 | Ronk et al. | 192/84.91 |
| 7,182,194 B2 | * | 2/2007 | Ronk et al. | 192/85 AA |
| 7,588,133 B2 | * | 9/2009 | Ronk et al. | 192/85 C |
| 2003/0090221 A1 | * | 5/2003 | Becker et al. | 318/254 |
| 2004/0266585 A1 | * | 12/2004 | Ochi et al. | 477/174 |

FOREIGN PATENT DOCUMENTS

| | | |
|---|---|---|
| DE | 40 07 162 A1 | 9/1991 |
| DE | 195 13 346 A1 | 10/1996 |
| DE | 102 05 411 A1 | 8/2003 |
| WO | WO/01 65151 A1 | 9/2001 |

* cited by examiner

*Primary Examiner*—David D Le
*Assistant Examiner*—Justin Holmes
(74) *Attorney, Agent, or Firm*—Davis & Bujold, P.L.L.C.

(57) ABSTRACT

A device (1) is described for controlling and/or regulating a hydraulically activatable shifting element. The shifting element (2) is configured with a piston-cylinder unit (3) that can be acted upon by a hydraulic operating pressure (p) and can be arranged in an installation space that is connected to an oil sump of the gearing mechanism device. In addition, the device (1) is provided with an electric motor (5) that can be actuated by a control and/or regulator unit (4), and which is provided with a drive-transformer device (6) that has a functional connection to the electric motor (5), by way of which the rotational drive of the electric motor (5) can be transformed into the hydraulic operating pressure (p) for the shifting element (2).

18 Claims, 2 Drawing Sheets

DEVICE FOR CONTROLLING AND/OR REGULATING A HYDRAULICALLY ACTIVATABLE SHIFTING ELEMENT OF A GEARING MECHANISM AND A GEARING MECHANISM

This application claims priority from German Application Serial No. 10 2005 058 776.3 filed Dec. 9, 2005.

FIELD OF THE INVENTION

The invention applies to a device for controlling and/or regulating at least one hydraulically activatable shifting element of a gearing mechanism, which is configured with a piston-cylinder unit that is acted upon by a hydraulic actuation pressure and a gearing mechanism.

BACKGROUND OF THE INVENTION

In the gearing mechanisms known from conventional practice, shifting elements are preferably hydraulically activated due to the demand for high power density. A central hydraulic control device normally produces a control pressure in a hydraulic system by way of pressure controllers and valve units placed downstream from them, along with the hydraulic fluid flows necessary to actuate the shifting elements. In the operation of an automatic gearing mechanism, the central hydraulic control device is supplied by a permanently driven oil pump, or as the case may be, a pumping device by way of which the hydraulic system of a gearing mechanism is acted upon by the hydraulic-fluid volume flows that are required in all operating states of the gearing mechanism.

However, this has the disadvantage that the hydraulic-fluid volume flow delivered by the pumping device does not depend on requirements, but rather on rotation speed, i.e., is dependent on the number of revolutions produced by the main engine of the vehicle, the characteristic curve of the pumping device being designed for an operating state in which the pumping device displays its minimum delivery volume, and in which the users of the gearing mechanism, which have to be supplied with control pressure and hydraulic fluid via the hydraulic system, demonstrate a high requirement for hydraulic fluid. In this way, the pumping device, at high drive speeds, i.e., in high rotational-speed ranges of the driving engine, circulates hydraulic-fluid volume flows in the hydraulic system that are not needed to this extent by the hydraulic users of the gearing mechanism. In these operating ranges, the pumping device has an unnecessarily high power consumption, which reduces the efficiency of an automatic gearing mechanism and leads to an increase in fuel consumption in vehicles equipped with this type of automatic gearing mechanism compared to vehicles equipped with manual transmissions, whose shifting elements are essentially mechanically actuated.

In addition, hydraulic systems with gearing mechanisms that are configured as hydraulically actuatable shifting elements are known, in which a central feed line is supplied by a central pumping device with hydraulic fluid that is compressed to a predefined level of pressure, similar to a common-rail fuel-injection system of a diesel combustion engine. The feed line can be brought into functional connection with the shifting element via pressure controllers arranged in the proximity of shifting elements to be hydraulically actuated in such a way that the shifting elements are supplied or, as the case may be, acted upon by the pressure and hydraulic-fluid volume flows necessary to actuate them.

A disadvantage of this method is that the portion of the hydraulic fluid of an automatic transmission that is normally supposed to be raised to a lower level of control pressure, such as a lubricant-circuit or cooling-oil circuit level, is condensed to the high holding-pressure level of the portion of the hydraulic fluid of an automatic transmission that is intended for the actuation of multiple-disk clutch or multiple-disk brakes. This also means that the power consumption of the pumping device in these hydraulic systems is higher than that needed to supply the users of an automatic transmission. This leads to impairment of the efficiency of an automatic transmission and to an undesirably high fuel consumption by the vehicle.

The present invention is, therefore, based on the task of providing a device for controlling and/or regulating at least one hydraulically activatable shifting element of a gearing mechanism device, by way of which a gearing mechanism can be operated at a high degree of efficiency, and to create a gearing mechanism that can be operated at a high degree of efficiency.

SUMMARY OF THE INVENTION

A device, according to the invention, for controlling and/or regulating at least one hydraulically activatable shifting element of a gearing mechanism is equipped with an electric motor actuated by a control and/or regulator unit. The shifting element is executed with a piston-cylinder unit that is acted upon by a hydraulic operation pressure, and can be arranged in an installation space connected with the oil sump of a gearing mechanism. In addition, there is provision for a drive transformer that is operatively connected to the electric motor, by way of which the rotary drive of the electrical motor can be converted into the hydraulic operating pressure for the shifting element.

Consequently, an independent actuating element or else a control unit can be made advantageously available for the hydraulic activation of a shifting element and electrical energy can be individually transformed into hydraulic activation energy for each shifting element in conformity with its operating state and requirements.

This means that the energy to be applied for the activation of a shifting element is only needed when an electrical gearing mechanism demands the operation of a shifting element, i.e., a connection or a disconnection of the shifting element. In addition, through the use of a device of the invention, no central oil supply, known from practice, at the high level of pressure impairing the efficiency of a gearing mechanism is necessary, wherewith an automatic gearing mechanism equipped with the device, according to the invention, can be operated at better degree of efficiency compared to automatic gearing mechanisms known from the state of the art.

In addition to the device, according to the invention, a gearing mechanism can advantageously be provided with a central pumping device, by way of which a lubricant and cooling oil system at low temperature can be supplied with hydraulic fluid, a pumping device of this type exhibiting considerably lower power consumption during operation of the gearing mechanism than conventional pumping devices that are known from practice, which are provided for adjusting the control pressure required for the supply or operation of the shifting elements of a gearing mechanism as the case may be.

Basically, the term gearing mechanism is presently used for all gearing mechanisms in which the flux of force in a gearing mechanism is influenced by the use of shifting elements and in which the shifting elements are not exclusively manually operated. This means that the term gearing mechanism covers, for example, automatic gearbox transmissions such as planetary gears; sliding-gear drives or transmissions of mixed construction; double-clutch gears; automated conventional transmissions; gearing mechanisms that are continuously adjustable at least in certain ranges, such as the toroidal variators; variable speed gears, and hydrostatic variators or electrical variators, so-called transfer gearboxes, which are not used in road vehicles, but as reverse-gear units in ships.

In the case of the gearing mechanism according to the invention, which has shifting elements accommodated in an installation space connected with the oil sump of a gearing mechanism, each shifting element is assigned exactly one device in order to operate the shifting element, and each shifting element is assigned an independent means of actuation for hydraulic operation. In this way, a gearing mechanism configured, according to the invention, can be operated with lower power consumption and thus a higher degree of efficiency than gearing mechanisms that are known from the state of the art.

With an advantageous embodiment of the gearing mechanism, it is provided that the electric motors of the devices assigned to the shifting elements are driven by a common control and/or regulator unit in order to activate the shifting elements. Therewith exists the possibility of configuring the actuating devices provided to operate the shifting elements in a simple way that reduces cost and construction space.

Alternatively, a further development of the gearing mechanism, according to the invention, provides for the electric motors of the devices assigned to the shifting elements to be combined into groups and for each group of electric motors to be driven by a control and/or regulator unit assigned to that group in order to activate the shifting elements. This has the advantage of ensuring that if one of the control and/or regulator units fails, the electric motors that are combined into groups and driven by other control and/or regulator units of the gearing mechanism can still be operated and the gearing mechanism is still available for use, at least at in emergency operation.

An additional alternative configuration of the gearing mechanism is characterized by each electric motor of each device being assigned to a separate control and/or regulator unit by way of which the electric motor can be operated. In this way, in the event of a malfunction of one control and/or regulator unit, only the shifting element to which this control and/or regulator unit is assigned will be affected and not be operational to the desired extent. Therefore, the gearing mechanism can be operated at emergency level, that is impaired to a lesser degree relative to normal operation than a configuration of a gearing mechanism that consists of electric motors combined into groups.

BRIEF DESCRIPTION OF THE DRAWINGS

The invention will now be described, by way of example, with reference to the accompanying drawings. In the interest of clarity in describing the different versions, the same reference signs are used to denote components that have the same construction and function, wherein.

DETAILED DESCRIPTION OF THE INVENTION

Figure 1:
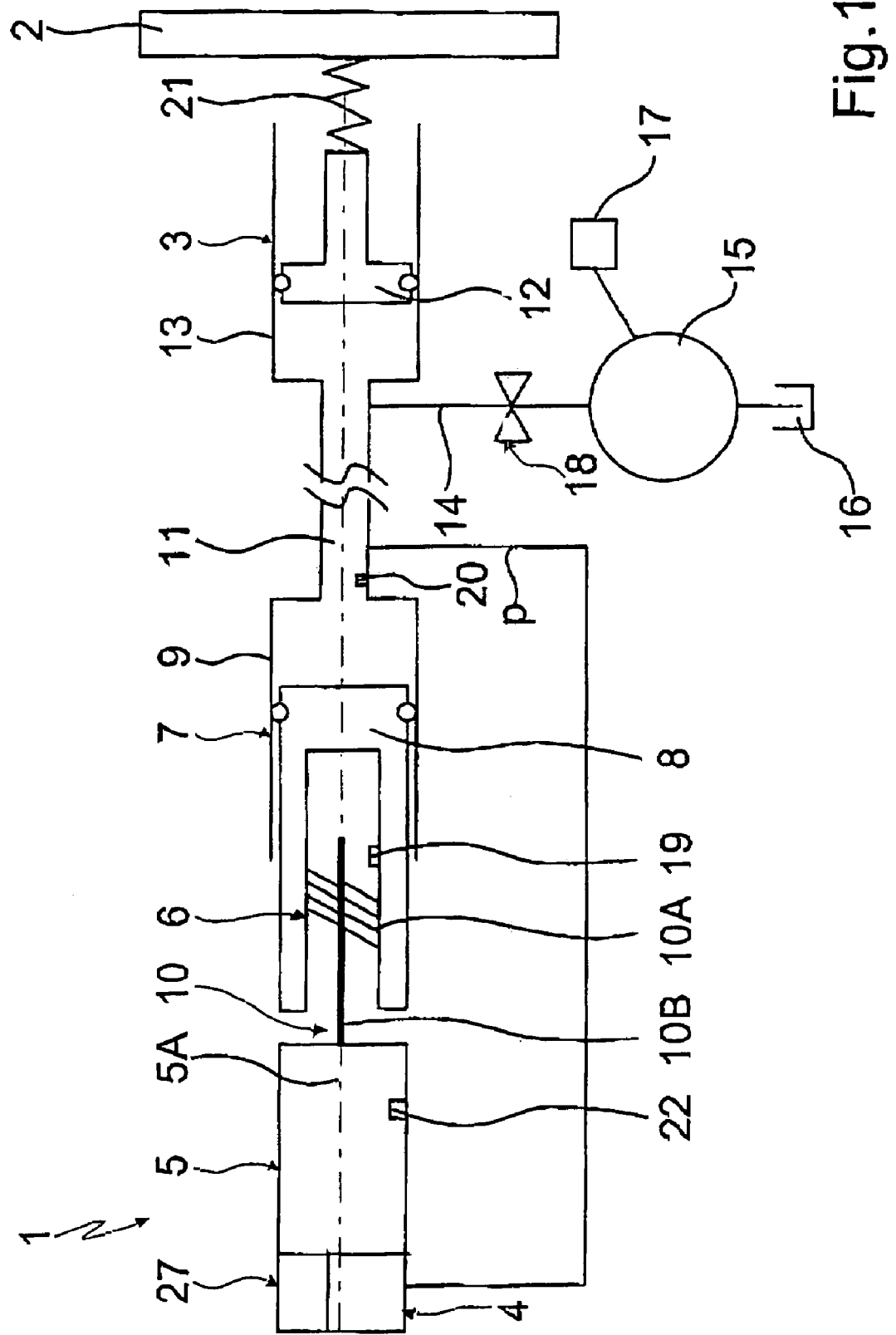
FIG. 1 is a schematic diagram of a device for controlling and/or regulating a hydraulically operated shifting element.

FIG. 1 presents a schematic diagram of a device 1 for controlling and/or regulating a hydraulically operated shifting element 2 of a gearing mechanism (not shown in detail), the element being accommodated in an installation space of the gearing mechanism that is connected with the oil sump of the gearing mechanism. Here the shifting element 2 is placed in relation to the housing of the gearing mechanism in such a way that the shifting element 2 can come into contact with the hydraulic fluid in the oil sump. The shifting element 2 is configured with a piston-cylinder unit 3 that can be acted upon by a hydraulic operating pressure p, and in this example consists of a frictionally-engaged multiple disk clutch of an automatic gearing mechanism for engaging ordisengaging a gear ratio of an automatic gearing mechanism.

Furthermore, the device 1 shows a control and/or regulator unit 4 and an electric motor 5 that is actuated by it. In addition, there is provision for a drive transformer device 6 that is functionally connected to the electric motor 5, by way of which the rotational drive of the electric motor 5 is transformed into the hydraulic operating pressure p for the shifting element 2.

The drive transformer device 6 is configured with a cylinder-piston device 7, in which a piston 8, exhibits translatory displacement dependent on the rotational drive of the electric motor 5 in relation to a cylinder 9 of the cylinder-piston device 7. The rotational drive of the electric motor 5 can be transformed into the translatory actuation motion of the piston 8 by way of a gearing mechanism 10 which, in this example, is configured as a spindle-nut arrangement that is functionally connected to a motor via a motor-output axle 5A. It is naturally left to the discretion of a person skilled in the art to configure the gearing mechanism 10 as a ball track system or as any other configuration in which the rotational drive of the electric motor can be transformed into a translatory actuation movement.

This means that the piston 8, depending on the rotation of the motor output axle 5A of the electric motor 5, is moved either away from the electric motor 5 or toward it in order to vary the operating pressure p for the shifting element 2, depending on operating conditions and requirements.

The device 1 represents a unit of a high-dynamically, configured electric motor 5, and the drive transformer device 6 intended for transformation of the rotary motion of the electric motor 5 into the linear motion of the piston 8 of the cylinder-piston device 7.

The piston-cylinder unit 3 of the shifting element 2 and the cylinder-piston device 7 of the drive transformer device 6 define a pressure chamber 11 and, in this case, the pressure in the pressure chamber 11 predominantly corresponds to the operating pressure p of the shifting element 2. In an additional version of the device 1 (not shown in detail), a differential piston that acts as a hydraulic converter is placed between the piston-cylinder unit 3 and the cylinder-piston device 7 and the pressure in the pressure chamber corresponds to a pressure equivalent to the operating pressure p.

The pressure in the pressure chamber 11 varies depending on the translatory motion of the piston 8 in relation to the cylinder 9 of the cylinder-piston device 7, as well as the condition of a piston cylinder unit 3, which is assigned to shifting element 2 and in which the pressure in the pressure chamber 11 or, as the case may be, the operating pressure p of the shifting element 2 rises with an increase in the length of the displacement path of the piston 8 in the direction of the piston-cylinder unit 3, causing a translatory actuation movement of a piston 12 of the piston-cylinder unit 3 opposite to a cylinder 13. This causes increasing compression of the disk pack of the shifting element 2 and the transfer capability of shifting element 2 is raised to a desired extent. At the same time, the operating pressure p is adjusted by an oil flow, which is predefined by way of a control and/or regulator 4 in the pressure chamber 11 and which corresponds to an oil column that is moved in a controlled manner and acted upon by pressure in the pressure chamber 11.

The spindle-nut arrangement 10 of the drive transformer device 6 is self-locking in this version, so that the piston 8 opposite the cylinder 9 of the cylinder-piston device 7 remains in position at any given time if the electric motor 5 is without electric current. This provides a simple way of keeping the shifting element 2 in its current position at any given time without further energy expenditure and improving the efficiency of the gearing mechanism equipped with the device 1 compared to conventional gearing mechanisms.

In order to compensate for leakage-volume flow from the pressure chamber 11 due to production tolerance, the pressure chamber 11 can be connected to a hydraulic line 14. Hydraulic fluid can be advantageously supplied to the pressure chamber 11, via the hydraulic line 14, when shifting element 2 is not in operation, i.e., when pressure values in the pressure chamber 11 are low, so that the pressure chamber 11 essentially has a constant filling volume during the entire operating time of the device 1.

In this example, the hydraulic line 14 is connected to a pumping unit 15, by way of which hydraulic fluid from an oil sump 16 of the gearing mechanism is supplied to the pressure chamber 11. The pumping unit 15 is intended to supply a cooling and lubricant-oil circuit 17 in which the connection between the pressure chamber 11 and the pumping unit 15 is closed by way of a locking device 18 which, in this example, is configured as a non-return valve, when there is a positive pressure gradient between the pressure chamber 11 and the pressure side of the pumping unit 15 is blocked.

Alternatively, there can also be a provision for the hydraulic line 14 to empty into an area of the pressure chamber 11 that is traversed by the piston 8 of the cylinder-piston device 7 during operation of the shifting element 2 so that the emptying area of the hydraulic line 14 is separated from the pressure chamber 11 with positions of the piston 8 corresponding to higher pressures in the pressure chamber 11.

In the case of the device 1 according to FIG. 1, which is intended to actuate the shifting element 2, which is configured as a multiple disk clutch, leakage is encouraged particularly when the cylinder 13 of the piston-cylinder unit 3 is configured as a rotating component, because in the area between the piston 12 and the cylinder 13, it is only possible to install the seal necessary for the functioning of the device 1 with major sealant outlay. With a shifting element configured as a multiple disk brake, the sealant outlay in this area is smaller, as at least half of the shifting element is attached to the housing and is, therefore, not executed as rotating.

In order to reduce the sealant outlay in the previously described area of the device 1, there can be a provision for shifting element 2, for example, which is configured as a rotating component to be actuated by a non-rotating hydraulic actuating element, i.e., the piston-cylinder unit 3, whereupon a so-called engagement or release bearing can be arranged for rotational decoupling between the shifting element 2 and the piston-cylinder unit 3, the decoupling unit being configured, for example, as an axial ball bearing.

In addition, departing from the previously described translatory motion of the piston of the cylinder-piston device 7, there is also the possibility of moving the cylinder 9, while the piston 8 of the cylinder-piston device 7 remains fixed. Additionally, however, there is the possibility of actuating both the piston 8 and the cylinder 9 by way of the electric motor 5 and having them move in relation to each other, in order to activate the shifting element 2. The latter version leads to a reduction of the displacement paths of both the piston 8 and the cylinder 9 of the cylinder-piston device 7 of the drive transformer device 6, because the piston 8 and the cylinder 9, due to the inverse displacement of the piston and the cylinder during adjustment of the operating pressure p in the pressure chamber 11, only have to travel half of their displacement path compared to displacement of only the piston 8 or the cylinder 9.

As an alternative to the pump-side supplying the cooling and lubricant-oil circuit, a version of the gearing mechanism that is not shown in detail provides for the components of the automatic gearing mechanism to be cooled and lubricated in a simple fashion by immersion of the rotating components of the automatic gearing mechanism in the oil sump 16 of the automatic gearing mechanism, the pumping unit 15 being provided solely for supplying the pressure chamber 11.

In the version shown, in order to determine the current condition of the device 1 and the shifting element 2, a linear transducer 19 is assigned to the drive transformer device 6 in order to detect the axial position of a nut 10A in relation to an axle 10B of the spindle-nut arrangement 10; and a pressure sensor 20 is provided to detect the operating pressure p of the shifting element 2.

A spring device 21 with a predefined spring characteristic is provided between the shifting element 2 and the piston 12 of the piston-cylinder unit 3 so that the disk pack of the shifting element 2 is compressed by the spring pressure of the spring element 21. This pressure rising according to the spring characteristic with operation pressure p and the displacement path of the piston 12 corresponding to it.

With knowledge of the displacement path of the piston 12 of the piston-cylinder unit 3, the actuation force acting on the shifting element 2 can be determined using the spring characteristic of the spring device 21, whereby the displacement path of the piston 12 can be determined by way of the linear transducer 19 or preferably via a position sensor 22 assigned to the electric motor 5 and intended to detect the position angle of the electric motor 5. A version of the device 1, according to FIG. 1, with the spring device 21 between the piston 3 and the shifting element 2, presents a cost-efficient embodiment as the pressure sensor 20 for determining the condition of the device 1 can be dispensed with.

In another embodiment of the invention (not shown in detail), the electric motor 5 can be provided with a rotational speed sensor for determining the condition of the device 1 in addition to the position sensor 22.

Figure 2:
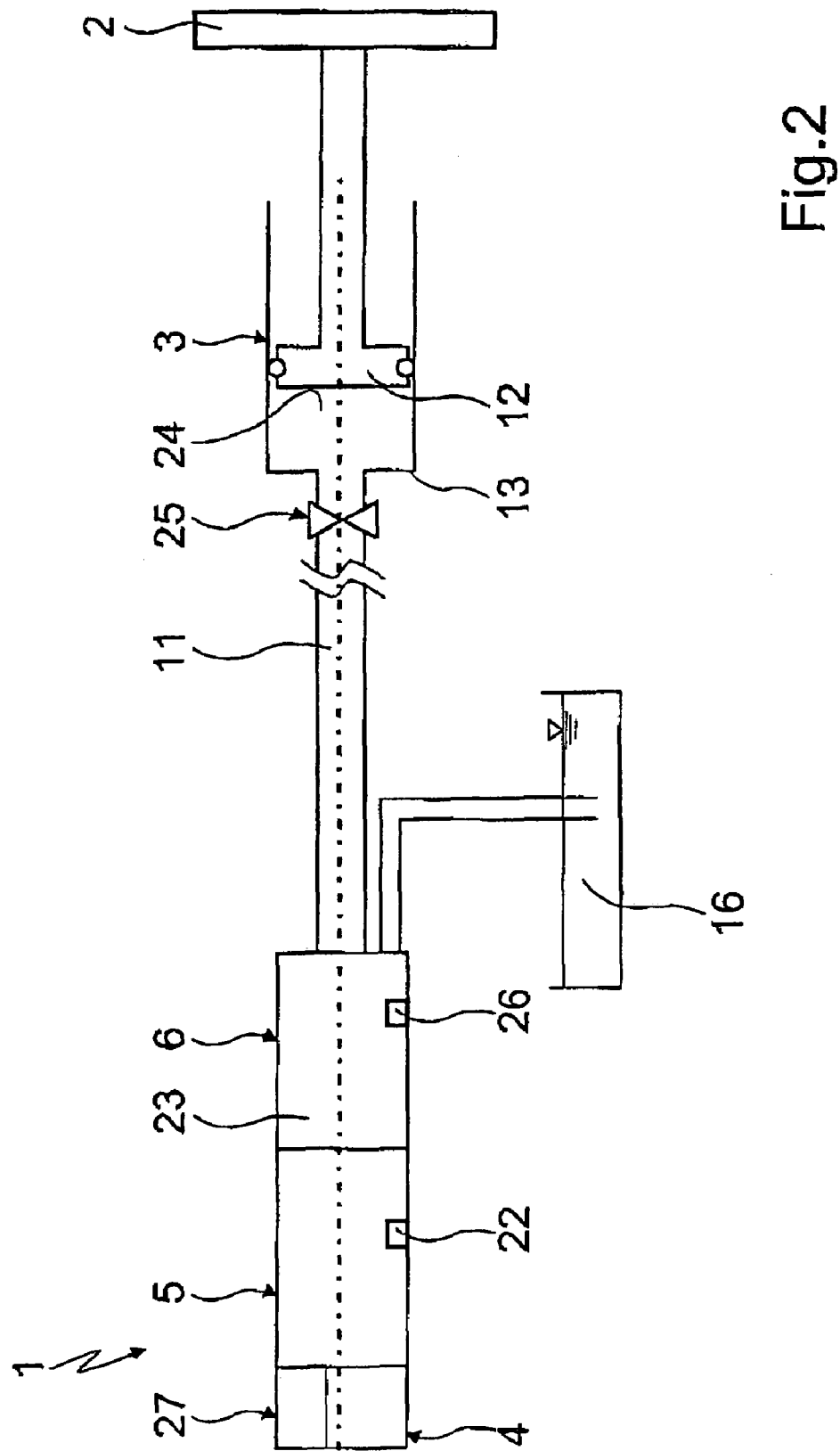
FIG. 2 is a presentation, corresponding to FIG. 1, of a second version of a device for control and/or regulation according to the invention.

FIG. 2 is a schematic diagram of a second embodiment of the device 1, according to the invention, for controlling and/or regulating the shifting element 2 in which the basic difference, compared to the first embodiment shown in FIG. 1, is seen in the area of the drive transformer device 6. The drive transformer device 6 of the device 1, according to FIG. 2, is configured as a pumping device 23 that is driven by the electric motor 5. The pumping device 23, acting upon the pressure chamber 11 of the piston-cylinder unit 3 of the shifting element 2 by way of the operating pressure p in the case of the corresponding actuation by the electric motor 5 or, in the corresponding embodiment of the device 1, by way of hydraulic pressure that, is equivalent to the operating pressure p of the shifting element 2. The pressure chamber 11 is connected to the pressure side of the pumping device 23, while the pumping device 23 is connected to the suction side of the oil sump 16 of the automatic gearing device.

In order to reduce the power consumption of the pumping device 23 when the shifting element 2 is in an activated state or, as the case may be, to improve the degree of efficiency of the automatic gearing mechanism, the device 1 is provided with a holding device 25 that is configured in this version as a stop valve or, as the case may be, a rotating valve in the area between the pumping device 23 and an abutting face 24 of the piston 12 opposite the pressure chamber 11, by way of which the holding device 25, the connection between the pumping device 23 and the piston-cylinder unit 3 of the shifting element 2 can be closed in a simple way and the operating pressure p maintained without additional actuation of the pumping device 23 by the electric motor 5.

Deviating from this, the piston 12 of the piston-cylinder unit 3 can be held in a position equivalent to that of the shifting element 2 in its active state by way of a holding device corresponding to the holding device known from DE 102 05 411 A1, in which the holding device engages in the direction of the position that actuates the shifting element when the piston 12 is actuated, and is transferred, by a subsequent further actuation of the piston 12, to a deactivated state in which the piston 12 can be moved into a position that is equivalent to a non-actuated state of the shifting element 2.

This means that the pumping device 23 must first be driven by the electric motor 5 to activate the shifting element 2. In the actuated state of the shifting element 2, the actuating force necessary for this is supplied either by closing the stop valve of the holding device 25 or through mechanical locking of the piston 12 so that the electric motor 5 is no longer supplied with electric current.

In order to ascertain the condition of the device 1, a pressure detection sensor 26 is assigned to the pumping device 23, by way of which the operating pressure p of the shifting element 2 is provided or an equivalent pressure value, which also corresponds to the manometric pressure of the pumping device 23.

The electric motor 5 of the device 1, according to FIG. 2, and the device 1, according to FIG. 1, is provided with power electronics intended for controlling the power flow of the electric motor 5 and controlling and/or regulating electronics intended for processing information comprising the electronics 27, which are functionally connected to the controlling and/or regulating unit 4 with the option of the electronics being integrated into the housing of the electric motor 5 or mounted on the housing of the electric motor 5.

The advantage of the device 1, according to FIG. 2, compared to the device 1, according to FIG. 1, is that a leakage in the pressure chamber 11 can be compensated for in a simple fashion by the pumping device 23 and the automatic gearing mechanism can be configured without the pumping unit 15 so that the previously described simple configuration of the lubricant and cooling-oil supply for the automatic gearing mechanism can be realized by immersing the rotating components of the automatic gearing mechanism in the oil sump 16, without oil being supplied by a pump.

In order to reduce the need for installation space in the automatic gearing mechanism, there can be provision for the device 1 according to FIG. 1 or according to FIG. 2, to be configured for the actuation of two or more shifting elements of the automatic gearing mechanism in which case, the shifting elements that are actuated by a shifting logic deposited in the gearing-mechanism actuating device and, which are actuated by the same device, are never switched on at the same time by the shifting logic.

A cost-efficient embodiment is the result when several devices, according to the invention, which are intended to actuate shifting elements of an automatic gearing mechanism are combined in a parallel arrangement as an integrally cast block so that the electric motors, the power electronics, the suburb electronics and the drive-transformer devices are all uniformly configured, which makes it simple to adjust this building-block system to the application required at any given time.

In addition to the previously described actuation of multiple-disk clutches or brakes, the device is also suitable for actuating other shifting elements of a gearing mechanism, such as the hydraulically activated synchronization of a parking-lock actuator or any other shifting element.

REFERENCE NUMBERALS 1 device
2 shifting element
3 piston-cylinder unit
4 control and/or regulator unit
5 electric motor
5A motor output axle
6 drive transformer device
7 cylinder-piston device
8 piston of the cylinder-piston device
9 cylinder of the cylinder-piston device
10 transmission, spindle-nut arrangement/gearing mechanism
10A nut
10B spindle/axle
11 pressure chamber
12 piston of the piston-cylinder unit
13 cylinder of the piston-cylinder unit
14 hydraulic line
15 pumping unit
16 oil sump
17 coolant and lubricant circuit
18 locking device
19 linear transducer
20 pressure sensor
21 spring device
22 position sensor
23 pumping device
24 face
25 holding device
26 pressure detection sensor
27 electronics of the electric motor
p hydraulic operating pressure

The invention claimed is:

1. A device (1) for at least one of controlling and regulating a hydraulically activatable shifting element (2) of a gearing mechanism, the device comprising an electric motor (5) that is actuated at least by a control and regulator unit (4), which has a drive transformer device (6) that is functionally connected to the electric motor (5), a rotational drive of the electric motor (5) is transformed into a hydraulic operating pressure (p) of the shifting element (2), the shifting element (2) is installed in an installation space that is connected to an oil sump of the gearing mechanism, the shifting element (2) communicates with and is activated by a piston-cylinder unit (3) and only one fluid connection connects the drive transformer device (6) with the first piston-cylinder unit (3).

2. The device according to claim 1, wherein the drive transformer device (6) is configured with a cylinder-piston device (7) having at least one of a piston (8) and the cylinder (9) which are displaced translatory, depending on the rotational drive of the electric motor (5) in relation to at least one of the cylinder (9) and the piston (8) of the cylinder-piston device (7).

3. The device according to claim 2, wherein the rotational drive of the electric motor (5) is transformed into the translatory operating movement of at least one of the piston (8) and the cylinder (9) of the cylinder-piston device (7) by way of a gearing mechanism (10) that is functionally connected to the motor, and has as a spindle-nut arrangement.

4. The device according to claim 3, wherein the drive transformer device (6) is assigned a linear transducer (19) to detect an axial position of one of a spindle (10B) and a nut (10A) of the gearing mechanism (10).

5. The device according to claim 2, wherein the piston-cylinder unit (3) of the shifting element (2) and the cylinder-piston device (7) define a pressure chamber (11) which accommodates the only fluid connection, pressure in the pressure chamber (11) corresponds to a pressure value equivalent to the operating pressure (p) of the shifting element and varies depending on the translatory movement of one or more of the piston (8) and the cylinder (9) of the cylinder-piston device (7), as well as the condition of the piston-cylinder unit (3) of the shifting element (2).

6. The device according to claim 2, wherein the drive transformer device (6) is self-locking, at least in the area of the gear mechanism (10).

7. The device according to claim 1, wherein a pressure sensor (20) is provided for determining the hydraulic operating pressure (p) of the shifting element (2).

8. The device according to claim 5, wherein the pressure chamber (11) is connected to a hydraulic line (14) to compensate for leakage, via which hydraulic fluid is supplied temporarily to the pressure chamber (11).

9. The device according to claim 1, wherein the drive transformer device (6) is provided with a pumping device (23) that is driven by the electric motor (5), the pumping device acts on a pressure chamber (11) of the piston-cylinder unit (3) with a hydraulic pressure equivalent to the operating pressure (p) of the shifting element (2) with corresponding actuation by the electric motor.

10. The device according to claim 1, wherein the piston-cylinder unit (3) of the shifting element (2) is held in a position that is at least equivalent to an active state of the shifting element (2) by way of a holding device (18; 25).

11. The device according to claim 9, wherein a pressure detection sensor (26) is provided, by way of which a manometric pressure of the pumping device (23) is detected.

12. The device according to claim 1, wherein the electric motor (5) has electronics (27) that comprise power electronics intended for control of the power-flow and one or more of control and regulator electronics that are intended for processing information, which are functionally connected with one or more of the control and regulator unit (4).

13. The device according to claim 1, wherein the electric motor (5) has at least one of a rotational-speed sensor and a position sensor (22).

14. A gearing mechanism with several actuatable shifting elements arranged in an installation space connected to an oil sump, wherein each shifting element is assigned exactly one device (1) for at least one of controlling and regulating the hydraulically activatable shifting elements (2), the device comprising an electric motor (5) that is actuated by at least one of a control and regulator unit (4), which has a drive transformer device (6) that is functionally connected to the electric motor (5), a rotational drive of the electric motor (5) is transformed into a hydraulic operating pressure (p) of the shifting element (2), the shifting element (2) being installed in an installation space that is connected to an oil sump of the gearing mechanism, and has a piston-cylinder unit (3), only one pressure chamber connects the drive transformer device to the piston-cylinder unit (3), the control and regulator unit (4) communicates with a column of oil to direct the column of oil to the pressure chamber (11) for adjusting the operating pressure (p) in the pressure chamber (11) depending the operating pressure (p).

15. The gearing mechanism according to claim 14, wherein the gearing mechanism has a plurality of electric motors of the devices for actuating the shifting elements and the plurality of electric motors are operated by way of one or more of a common control and a regulator unit.

16. The gearing mechanism according to claim 14, wherein the electric motors of the devices for actuating the shifting elements are combined into groups, and the electric motors are respectively operated by way of one or more of a common control and regulator unit.

17. The gearing mechanism according to claim 14, wherein each electric motor of each device is assigned one or more of a separate control and regulator unit, by way of which the electric motors are operated.

18. A device (1) for controlling a multi-disk clutch (2) of a gearing mechanism, the device (1) comprising:
a regulator unit (4) communicates with and controls rotational drive of a drive motor (5);
a drive transformer (6) is driven by the drive motor (5) and communicates with a pressure chamber (11) such that the rotational drive of the drive motor (5) is transformed into an adjustment of operating pressure (p) in the pressure chamber (11);
at least one sensor (19, 20, 22, 26) detects at least one of the operating pressure (p) in the pressure chamber (11) and a function of the drive transformer (6) and the drive motor (5), and rotational drive of the drive motor (5) is controlled by the regulator unit (4) depending on the operating pressure (p) and the function of the drive transformer (6) and the drive motor (5):
a piston-cylinder unit (3) and the drive transformer (6) define the pressure chamber (11) and only one pressure chamber extends between the piston-cylinder unit (3) and the drive transformer (6); and
the piston-cylinder unit (3) communicates, via a spring (21), with the multi-disk clutch (2) such that activation of the multi-disk clutch (2) depends on the operating pressure (p) in the pressure chamber (11) and pressure from the spring (21).

* * * * *